(12) United States Patent
Applegate et al.

(10) Patent No.: US 6,251,350 B1
(45) Date of Patent: Jun. 26, 2001

(54) PROCESS FOR THE MANUFACTURE OF THIOPHOSPHORYL CHLORIDE

(75) Inventors: Jacqueline M. Applegate, Leverkusen-Steinbuchel (DE); Peter E. Newallis; Vidyanatha A. Prasad, both of Leawood, KS (US)

(73) Assignee: Bayer Corporation, Pittsburgh, PA (US)

( * ) Notice: Subject to any disclaimer, the term of this patent is extended or adjusted under 35 U.S.C. 154(b) by 60 days.

(21) Appl. No.: 09/337,088

(22) Filed: Jun. 21, 1999

(51) Int. Cl.$^7$ .................................................. C01B 25/10
(52) U.S. Cl. ............................................. 423/303; 423/300
(58) Field of Search ..................... 423/303, 300

(56) References Cited

U.S. PATENT DOCUMENTS 5,464,600   11/1995   Newallis et al. .................... 423/300

FOREIGN PATENT DOCUMENTS 1145589   3/1963   (DE) .
694380    7/1953   (GB) .

*Primary Examiner*—Tom Dunn
*Assistant Examiner*—Maribel Medina
(74) *Attorney, Agent, or Firm*—Joseph C. Gil

(57) ABSTRACT

The present invention relates to an improved process for the preparation of thiophosphoryl chloride which is useful as an intermediate for the synthesis of insecticidally active compounds. The improvement comprises the presence in the reaction mixture of a catalytic amount of a nitroxide free radical of the following general formula:

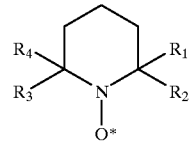

wherein $R_1$, $R_2$, $R_3$ and $R_4$ represent an alkyl group.

12 Claims, No Drawings

PROCESS FOR THE MANUFACTURE OF THIOPHOSPHORYL CHLORIDE

TECHNICAL FIELD OF THE INVENTION

The present invention relates to an improved process for the preparation of thiophosphoryl chloride which is useful as an intermediate for the synthesis of insecticidally active compounds. The improvement comprises the presence of a catalytic amount of a nitroxide free radical in the reaction mixture.

BACKGROUND OF THE INVENTION

A process for the preparation of thiophosphoryl chloride is known in the art. British Patent 694,380 discloses the preparation of thiophosphoryl chloride ($PSCl_3$) by refluxing phosphorous trichloride ($PCl_3$) and excess sulfur at atmospheric pressure, in the presence of carbon (activated with $K_2S$) and about 40 mole percent of thiophosphoryl chloride for about three hours. German Patent 1,145,589 discloses that thiophosphoryl chloride is obtained by treating phosphorous trichloride and sulfur in liquid phase at atmospheric pressure, using aluminum or alloys thereof, preferably aluminum wastes, as a catalyst. Thiophosphoryl chloride is preferably used as the reaction medium and moderator. Further, U.S. Pat. No. 5,464,600 discloses that thiophosphoryl chloride is obtained by reacting phosphorous trichloride and sulfur in the presence of a catalytic amount of a tertiary amine.

SUMMARY OF THE INVENTION

The present invention provides an improved process for preparing thiophosphoryl chloride by reacting phosphorous trichloride with sulfur in the presence of a catalytic amount of a tertiary amine, and in the presence of a catalytic amount of a nitroxide free radical of the following general

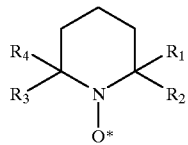

wherein $R_1$, $R_2$, $R_3$ and $R_4$ represent an alkyl group.

The improvement comprises the presence of a catalytic amount of the nitroxide free radical.

DETAILED DESCRIPTION OF THE INVENTION

The present invention provides an improved process for preparing thiophosphoryl chloride by reacting phosphorous trichloride with sulfur in the presence of a catalytic amount of a tertiary amine, and in the presence of a nitroxide free radical. The improvement comprises the addition of a catalytic amount of the nitroxide free radical in the reaction mixture. The nitroxide free radical is of the following general formula:

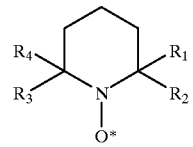

wherein $R_1$, $R_2$, $R_3$ and $R_4$ represent an alkyl group.

In a preferred embodiment, the nitroxide free radical is 2,2,6,6-tetramethyl-1-piperidinyloxy ("TEMPO"). TEMPO is a standard nitroxide free radical which may be commercially obtained from Lancaster [CAS # 2564-83-2]. Further, in this embodiment, the tertiary amine may be selected from a group of pyridines which are preferably substituted pyridines such as 5-ethyl-2-methylpyridine, 2-methylpyridine, 2,4-dimethylpyridine, 2,6-dimethylpyridine, 2,4,6-trimethylpyridine, trialkylamines (e.g., tripropylamine and tributylamine), tris-[2-(2-methoxyethoxy)ethyl]amine and 1,8-diazabicyclo[5.4.0]undec-7-ene.

In the process of the invention, the sulfur and phosphorous trichloride can be employed in a ratio of sulfur to phosphorous trichloride that is in the range of about 1.0:1.0 to about 1.5:1.0, and preferably about 1.4:1.0. The nitroxide free radical may be present in a ratio of nitroxide free radical to phosphorous trichloride that is in the range of about 0.002:1.0 to about 0.004:1.0, and preferably about 0.00314:1.0. The tertiary amine can be used in a ratio of tertiary amine to phosphorous trichloride that is in the range of about 0.15:1.0 to about 0.20:1.0, and preferably about 0.16:1.0.

The reaction can be conducted at initial temperatures of about 110° C. to about 140° C., and preferably from about 115° C. to about 120° C.

The reaction product containing thiophosphoryl chloride is typically distilled to remove the thiophosphoryl chloride. Following isolation of the thiophosphoryl chloride and phosphorous oxychloride by-product, the distillation heel which contains the tertiary amine and the nitroxide free radical, can be recycled for use in another reaction of phosphorous trichloride and sulfur.

In accordance with the invention, the process is well suited to either a batch or continuous reaction. In the continuous reaction, the distillation heel is recycled continuously to a primary reactor stage, where the sulfur and phosphorous trichloride are reacted.

The invention is further illustrated but is not intended to be limited by the following examples in which all parts and percentages are by weight unless otherwise specified.

EXAMPLES

Example 1

To a 500 ml 4-necked round bottomed flask (fitted with a mechanical stirrer, thermometer, Friedrich condenser cooled to (−10° C.), nitrogen blanket adaptor and Erlenmeyer flask containing 5% sodium hydroxide through which gases are bubbled) was charged about 1.4 moles (44.9 grams) of sulfur and 1.0 mole (140.1 grams) of phosphorous trichloride. About 0.16 mole (30 grams) of tributylamine (TBA) and 0.00314 mole (0.5 gram) of 2,2,6,6-tetramethyl-1-piperidinyloxy (TEMPO) were then charged to the reaction mixture. The reaction was monitored by a gas chromatograph. The reaction temperature was gradually raised to about 120° C., cooked, and then the reaction mixture was subjected to atmospheric distillation. The time at reflux (i.e., the reaction time) was about 2 hours and 8 minutes. The time for distillation was about 40 minutes. The thiophosphoryl chloride yield in the distilled product was about 78.5%. The heel residue comprising thiophosphoryl chloride, tributylamine, and TEMPO, was saved for the next cycle.

In this second reaction, about 1.4 moles (44.9 grams) of sulfur and 1.42 moles (199.0 grams) of phosphorous trichloride were charged to the reactor vessel. Since the distillation heel contained tributylamine and TEMPO, no additional tributlyamine and TEMPO were needed in the reaction mixture. The reaction mixture was heated to 120° C., cooked, and then the reaction mixture was subjected to atmospheric distillation. The time at reflux (i.e., the reaction time) was about 40 minutes. The time for distillation was about 1 hour and 3 minutes. The cumulative yield of thiophosphoryl chloride in the distilled product was about 82.5% based on the phosphorous trichloride charged. The heel residue comprising thiophosphoryl chloride, tributylamine, and TEMPO, was saved for the next cycle.

In this third reaction, about 1.4 moles (44.9 grams) of sulphur and 1.42 moles (199.0 grams) of phosphorous trichloride were charged to the reactor vessel. Since the distillation heel contained tributylamine and TEMPO, no additional tributylamine and TEMPO were needed in the reaction mixture. The reaction mixture was heated to 120° C., cooked, and then the reaction mixture was subjected to atmospheric distillation. The time at reflux (i.e., the reaction time) was about 30 minutes. The time for distillation was about 43 minutes. The cumulative yield of thiophosphoryl chloride in the distilled product was about 84.9% based on the phosphorous trichloride charged. The heel residue comprising thiophosphoryl chloride, tributylamine, and TEMPO, was saved for the next cycle.

In this fourth reaction, about 1.4 moles (44.9 grams) of sulphur and 1.42 moles (199.0 grams) of phosphorous trichloride were charged to the reactor vessel. Since the distillation heel contained tributylamine and TEMPO, no additional tributylamine and TEMPO were needed in the reaction mixture. The reaction mixture was heated to 120° C., cooked, and then the reaction mixture was subjected to atmospheric distillation. The time at reflux (i.e., the reaction time) was 22 minutes. The time for distillation was about 55 minutes. The cumulative yield of thiophosphoryl chloride in the distilled product was about 87.9% based on the phosphorous trichloride charged. The heel residue comprising thiophosphoryl chloride, tributylamine, and TEMPO, was saved for a subsequent cycle.

Table I shows the results of the reactions.

TABLE I

| Reaction | $PCL_3$/Sulfur/TBA/TEMPO (Moles) | | | | Reaction Time (Hr/min) | Cumulative Yield (%) |
|---|---|---|---|---|---|---|
| Heel | 1.00 | 1.40 | 0.16 | 0.00314 | 2 hr 8 min | 78.5 |
| Recycle 1 | 1.42 | 1.40 | — | — | 40 min | 82.5 |
| Recycle 2 | 1.42 | 1.40 | — | — | 30 min | 84.9 |
| Recycle 3 | 1.42 | 1.40 | — | — | 22 min | 87.9 |

Example 2

The test conducted in Example 1 was repeated, with the exception that the reaction was carried out in the absence of TEMPO. The thiophosphoryl chloride yield in the distilled product was about 72.8%, after a reaction time of 3 hours and 44 minutes.

As described above in Example 1, the distillation heel remaining in the flask following the distillation, was used in three subsequent cycles. Since the distillation heel contained tributylamine, no additional tributlyamine was needed in the reaction mixture. The cumulative yield of distilled product over 3 batches, amounted to 91.6% based on the phosphorous trichloride charged. Table II shows the results of the reactions.

TABLE II

| Reaction | $PCL_3$/Sulfur/TBA (Moles) | | | Reaction Time (Hr/min) | Cumulative Yield (%) |
|---|---|---|---|---|---|
| Heel | 1.00 | 1.40 | 0.16 | 3 hr 44 min | 72.8 |
| Recycle 1 | 1.42 | 1.40 | — | 34 min | 83.5 |
| Recycle 2 | 1.42 | 1.40 | — | 20 min | 89.7 |
| Recycle 3 | 1.42 | 1.40 | — | 24 min | 91.6 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing thiophosphoryl chloride comprising the step of reacting phosphorous trichloride with sulfur in the presence of a tertiary amine catalyst, and in the presence of a catalytic amount of a nitroxide free radical of the general formula:

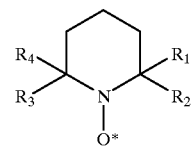

wherein $R_1$, $R_2$, $R_3$ and $R_4$ represent an alkyl group.

2. The process of claim 1 wherein the molar ratio of sulfur to phosphorous trichloride is from about 1.0:1.0 to about 1.5:1.0.

3. The process of claim 1 wherein the molar ratio of tertiary amine catalyst to phosphorous trichloride is from about 0.15:1.0 to about 0.20:1.0.

4. The process of claim 1 wherein the molar ratio of nitroxide free radical to phosphorous trichloride is from about 0.002:1.0 to about 0.004:1.0.

5. The process of claim 1 wherein the tertiary amine catalyst is selected from the group consisting of 5-ethyl-2-methylpyridine, 2-methylpyridine, 2,4-dimethylpyridine, 2,6-dimethylpyridine, 2,4,6-trimethylpyridine, tris-[2-(2-methoxyethoxy)ethyl]amine and 1,8-diazabicyclo[5.4.0]undec-7-ene.

6. The process of claim 1 wherein the tertiary amine catalyst is a trialkylamine.

7. The process of claim 1 wherein the tertiary amine catalyst is tributylamine.

8. The process of claim 1 wherein the nitroxide free radical is 2,2,6,6-tetramethyl-1-piperidinyloxy.

9. The process of claim 1 wherein the reaction is conducted at a temperature of 110° C. to 140° C.

10. The process of claim 1 wherein the reaction is conducted at normal atmospheric pressure.

11. The process of claim 1 further comprising distilling thiophosphoryl chloride from the reaction product leaving behind the distillation heel containing the tertiary amine catalyst and the nitroxide free radical.

12. The process of claim 11 further comprising recycling the distillation heel to a subsequent reaction stage of the phosphorous trichloride and sulfur to produce thiophosphoryl chloride.

* * * * *